United States Patent
Stewart

[15] 3,652,029
[45] Mar. 28, 1972

[54] LEVEL WIND FOR SPOOLING DRUM

[72] Inventor: Faye H. Stewart, Eugene, Oreg.

[73] Assignee: Bohemia Lumber Company, Incorporated, Eugene, Oreg.

[22] Filed: June 22, 1970

[21] Appl. No.: 48,263

[52] U.S. Cl. ........................................................242/157.1
[51] Int. Cl. ...................................B65h 57/14, B65h 57/28
[58] Field of Search................................................242/157.1

[56] References Cited

UNITED STATES PATENTS

| | | | |
|---|---|---|---|
| 3,206,139 | 9/1965 | Smith et al. | 242/157.1 |
| 2,387,245 | 10/1945 | Davidson et al. | 242/157.1 |
| 3,083,932 | 4/1963 | Crowley et al. | 242/157.1 |
| 3,122,341 | 2/1964 | Le Bus, Sr. et al. | 242/157.1 |

FOREIGN PATENTS OR APPLICATIONS 97,531   3/1961   Netherlands........................242/157.1

Primary Examiner—Stanley N. Gilreath
Attorney—Seed, Berry & Dowrey

[57] ABSTRACT

A level wind apparatus for use in cooperation with a spooling drum to wind the cable evenly across the drum core. The level wind apparatus has a sheave mounted for axial movement along a bar of rectangular cross section while turning about its axis. The sheave has a plurality of supporting bearings in contact with the bar. The bar is eccentrically mounted in the manner standard for this type of apparatus.

5 Claims, 10 Drawing Figures

PATENTED MAR 28 1972
3,652,029
SHEET 1 OF 2
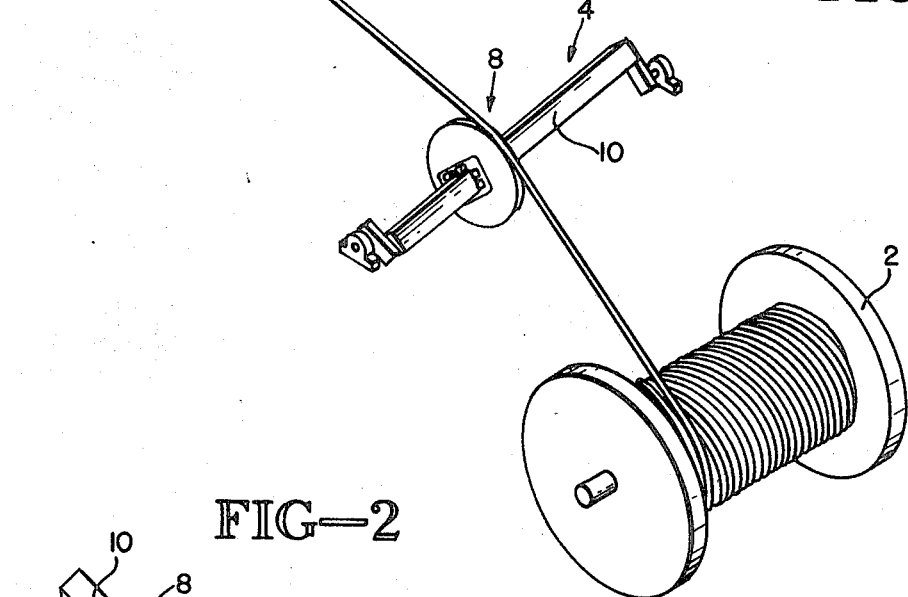
FIG-1
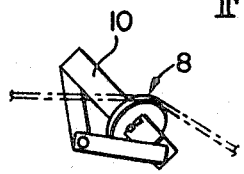
FIG-2
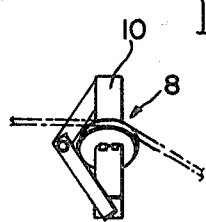
FIG-3
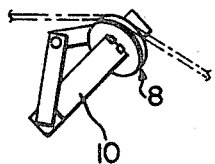
FIG-4
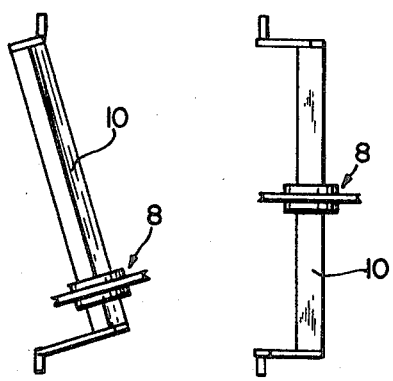
FIG-5   FIG-6   FIG-7
INVENTOR.
FAYE H. STEWART
BY *Seed, Berry & Dowrey*
ATTORNEYS

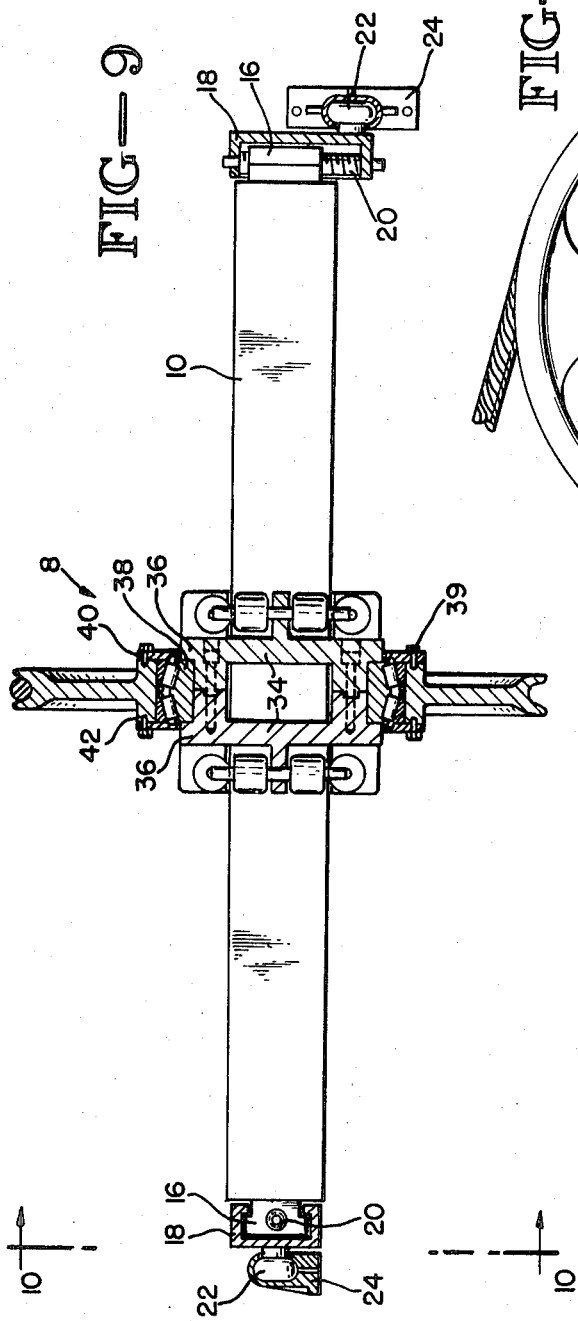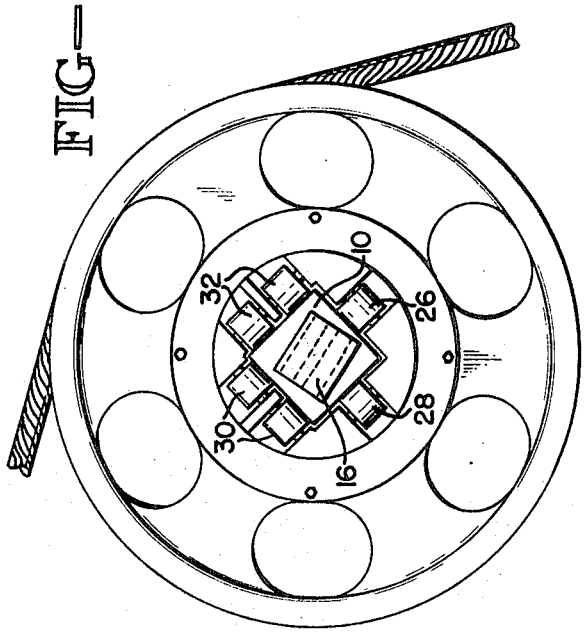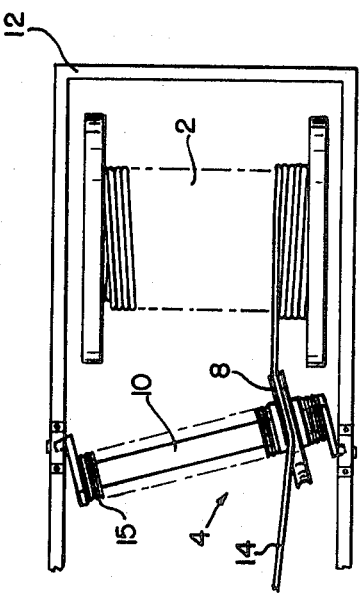

LEVEL WIND FOR SPOOLING DRUM

BACKGROUND OF THE INVENTION

This invention relates to improvements in cable spooling apparatus and more particularly but not by way of limitation to a cable reeving, automatic compensator apparatus. The apparatus or level wind mechanism is particularly designed and constructed for compensating for and correcting the fleet angle of the cable, when the fleet angle of the cable winding onto or off of the drum is a detriment to the even spooling of the cable. The apparatus enables the cable to be spooled onto the drum efficiently and evenly without distortion or tangling of the cable during the winding operation. Apparatus of the type described is fully disclosed in U.S. Pat. No. 3,083,932, granted Apr. 2, 1963.

One of the difficulties with currently available level wind apparatuses is that under the pressures to which they are subjected and the rate of cable movement during operation, the bearings which allow the sheave to move along the shaft cannot be retained in place. In a typical logging operation the cable would carry in the vicinity of 5 tons and in a balloon logging operation be subjected to pressures of 10 to 12 tons and a cable movement of about 1,500 lineal feet per minute. Under these conditions the sheave would be operating under extreme stress and the movement along the shaft would be very rapid.

An object of the present invention is to provide a fleet angle compensating apparatus wherein there is included a novel floating sheave mounted upon an eccentric rectangular shaft, said mounting being actually frictionless allowing ready movement of the sheave along the shaft.

A further object of the present invention is to provide a novel sheave construction which, in cooperation with a square bar, is not only frictionless but also of sufficient structural integrity to withstand the forces inherent in such an operation.

Other objects and advantages of the invention will be evidenced from the following detailed description read in conjunction with the accompanying drawings which illustrate out invention.

BRIEF DESCRIPTION OF THE DRAWINGS

FIG. 1 is a perspective view of the fleet angle compensator or level wind apparatus embodying the invention and depicted in combination with a cable spooling drum and fixed fairlead;

FIGS. 2, 3 and 4 are end views of the fleet angle compensator during three of the positions which will be assumed in operation;

FIGS. 5, 6 and 7 are plan views of the fleet compensator corresponding respectively to FIGS 2, 3 and 4;

FIG. 8 is a plan view of the fleet angle compensator in one possible environment;

FIG. 9 is an enlarged view of the fleet angle compensator with portions of the sheave and mounting means in section showing details of the internal structure; and FIG. 10 is a view along lines 10—10 of FIG. 9 further indicating structural details of the sheave mechanism.

DETAILED DESCRIPTION OF THE DRAWINGS

As seen in FIG. 1, the invention relates to cable spooling wherein the cable is wrapped about a drum 2. It is desireable to have the wrap extend around the drum core from flange to flange in even layers. To accomplish the even wrap, there is included a compensator apparatus or level wind denoted generally by reference numeral 4 located in a position spaced from the drum 2. The location of the level wind is such that it will, through automatic operation, present cable to the drum at an angle of approximately 90° to the axis of the drum. Since the cable itself will normally be fed to and from a location which will be divergent, such as when used in logging operations and the cable extends to various portions of the area being logged or when used on a boom and the boom swings or raises and lowers, there is provided a fairlead 6 of standard construction to guide the cable to a sheave 8 mounted on a bar 10 of the level wind apparatus from a relatively stable uniform direction eliminating the divergent angle. Since the fairlead 6 will often be located in close proximity to the drum it, being fixed, will present an excessive fleet angle to the drum requiring a compensating or level wind apparatus.

Reference is now made collectively to FIGS. 2–7 which show respectively the top and end views of the level wind apparatus during the representative stages of its operation, it is to be understood that the other stages would be intermediate of the stages shown. It can be seen that FIG. 2 which corresponds to FIG. 5, the sheave 8 which is designed to slidably move along the bar 10 of the level wind apparatus is at its leftwardmost position with reference to FIG. 1. When the sheave is located at this position, the cable would be wrapped about the left-hand end of the drum 2. As the drum continues to wrap the cable, the sheave 8 would move to the central position as seen in FIGS. 3 and 6 and then move automatically with the wrapping action to the right-hand end of the drum 2, reference again being had to FIG. 1 as shown in FIGS. 4 and 7. This wrap and accompanying movement of the sheave will move back and forth until the cable is wrapped.

It is to be understood that this movement of the sheave 8 along the bar 10 is inherently automatic and is a function of the design of the level wind apparatus. The configuration of the level wind apparatus in the broad sense, wherein the sheave carrying element is mounted with each end of the sheave supporting apparatus, is offset on opposite sides of the axes of rotation is known as shown by U.S. Pat. No. 3,083,932 noted above. It is the mounting of the shaft for a reciprocating motion about support means which causes the moveable sheave 8 to advance axially along the shaft or bar in response to cable pressure which accomplishes the level wind itself.

Referring now specifically to FIG. 8, it can be seen that the drum 2 is mounted within a framework 12 and the level wind apparatus having an axially moveable sheave 8 and a shaft or bar 10 are likewise mounted within the framework 12. Cable 14 passes over the moveable sheave 8 and then is wrapped in a level fashion upon the drum 2. Further to be noted with regard to FIG. 8 is that to prevent dirt or other contaminants from getting to the specific sheave mechanism which will be hereinafter described, there is an accordion-like sleeve 15 attached to the hub of the sheave and secured at the ends of the rod which expands or contracts as the sheave moves along the bar 10 thus continuously keeping the entire interior mechanism of the sheave and the bar or shaft upon which it is mounted in as clean a condition as possible.

Referring now specifically to FIGS. 9 and 10, it can be seen that the level wind mechanism comprises a square bar 10 of sufficient length to allow the sheave 8 to direct the cable completely across the width of the drum, not shown. The bar has machined on each of its ends a T-block or extension 16 which, as can be seen in FIG. 10, is oriented with its edges at an angle to the sides of the bar 10. The orientation of the T-blocks is to impart the desired motion to the mechanism. Each of the T-blocks 16 fit within a housing or arm 18 and are held in proper position within the slotted housing by an adjusting screw 20. At the opposite end of the slotted housing 18 which serves to offset the bar 10 from the axes of rotation there is a pillow block 22 and an appropriate bearing housing or support 24 by which means the level wind will be mounted to a framework or other appropriate relatively fixed apparatus.

The sheave is mounted for axial movement along a square bar as opposed to the conventional round rod and the elements of the sheave will not be specifically described. FIG. 10 depicts the sheave as it would be oriented when located in position centrally of the bar 10, similar to that shown in FIG. 9. It is to be noted that the sheave has a plurality of bearings which allow it to move freely along the bar 10 and that in the position shown the sheave has a single bearing 26 and 28 in contact with each surface of the square bar 10 at the lower portion and a pair of bearings 30 and 32 mounted to contact each flat surface of the upper portion of the bar 10 whereat the greatest amount of stress will be applied. The combination of placing the double bearings 30, 32 where they will ride on top of the bar 10 when the sheave is in the central position as described above and the particular angle at which the T-block is machined to the bar 10 allows the sheave to operate in such a manner that one pair of bearings 30, 32 will always ride against the uppermost portion of the bar 10 carrying the greatest amount of stress and weight.

It is to be understood that single bearings 26 and 28 serve the purpose of retaining the sheave in proper position upon the bar and provide a relatively frictionless guide but are not designed to carry as great amount of weight as the pairs of bearings 30, 32.

Looking now at FIG. 9, it can be seen that the bearings hereinabove described are mounted axially outwardly of the sheave but directly connected to the two piece hub 34. The hub 34 has flanges 36 which extend outwardly and serve to lock bearing cage 38 in position. Further, to secure the bearings 39 to the sheave are a pair of circular retaining plates 40, 42 fastened to the cable guiding portion 44 of the sheave.

It will be understood that bearings 26, 28, 30 and 32 serve to provide easy movement of the sheave structure along the bar 10 and the bearings 39 provide frictionless rotational movement of the sheave about the bar 10.

The use of the square bar and the bearings placed such that structural strength is provided only at those portions where it is needed result in a structure of far greater life expectancy, ease of assembly and relatively low manufacturing cost.

The embodiments of the invention in which an exclusive property or privilege is claimed are defined as follows:

1. A level wind spooling drum comprising;
   a pair of supports mounted in close proximity to the drum along a line approximately parallel thereto,
   an arm pivotally mounted to each of the support,
   rectangular shaft means fixedly mounted between the arms,
   sleeve means mounted upon a plurality or roller bearings in rolling contact with the sides of the shaft means for relatively frictionless linear movement of the sleeve means along said shaft means, and
   sheave means mounted for rotation upon the sleeve means whereby the sheave means will rotate about the sleeve means as said sleeve means moves along the shaft means.

2. A level wind as in claim 1 wherein the shaft means is mounted between the arms by means of linear extensions of the shaft means.

3. A level wind as in claim 2 wherein the extensions are rectangular and have sides which are angularly offset from the sides of the shaft means but extend in the same direction.

4. A level wind as in claim 1 wherein the sleeve means has a plurality of bearings mounted upon a pair of adjacent sides of said shaft means.

5. A level wind as in claim 4 wherein the sleeve means is mounted upon the shaft means and the shaft means restricted in movement such that one of the sides having a plurality of bearings remains upon the uppermost side of the shaft means whereat it is in the position of greatest stress during operation.

\* \* \* \* \*